United States Patent Office 3,328,430
Patented June 27, 1967

3,328,430
EPOXIDATION PROCESS
Louis I. Hansen, Minneapolis, Minn., and Alexis G. Coutsicos, Kansas City, Kans., assignors to Archer-Daniels-Midland Company, Minneapolis, Minn., a corporation of Delaware
No Drawing. Filed Nov. 16, 1964, Ser. No. 411,611
10 Claims. (Cl. 260—348.5)

This application is a continuation-in-part of our copending application Ser. No. 670,386, filed July 8, 1957, now abandoned.

The present invention relates to a novel process for the epoxidation of ethylenically unsaturated compounds capable of epoxidation and more particularly to the epoxidation mono- and poly-non-conjugated ethylenically unsaturated compounds employing a novel, synergistic combination of reagents.

Heretofore the epoxidation of ethylenically unsaturated compounds has generally employed peracetic acid, performic acid, or hydrogen peroxide with either acetic acid or formic acid. These methods are, however, subject to a number of disadvantages in that they cause over-oxidation resulting in the splitting of the oxirane ring, polymerization of the reagents, and formation of undesirable by-products. The epoxide products obtained by these methods when employed as vinyl resin plasticizers exhibit such disadvantages as reduced electrical resistivity, reduced water impermeability, reduced plasticization as well as give rise to color and odor problems. In order to reduce these disadvantages it is generally necessary to also reduce the yield and conversion to the epoxide.

Accordingly it is thereofore an object of the present invention to provide an improved epoxidation process. It is a further object of the present invention to provide an improved epoxidation process which is broadly applicable to epoxidizable compounds. It is another object of the present invention to provide an epoxidation process capable of higher yields and lower by-product formation. Still another object of the present invention is to provide an epoxidation process which significantly reduces oxirane splitting at high conversions. Still a further object of this invention is to provide an epoxidation process which employs two epoxidizing agents having a synergistic effect on the reaction. Other objects will become apparent hereinafter.

These objects of the present invention are accomplished by reacting a compound containing at least one epoxidizable, ethylenically unsaturated double bond with an epoxidizing agent comprising a combination of formic acid, a short chain carboxylic acid having from two to three carbon atoms, preferably acetic acid, and hydrogen peroxide, and recovering the oxirane linkage containing product. As in the epoxidation reactions of the prior art, the process of the present invention is preferably carried out in the presence of an acid catalyst.

The epoxidation process of the present invention is useful for the epoxidation of ethylenically unsaturated compounds which contain five or more carbon atoms and in which the ethylenic unsaturation is not conjugated. The term conjugation as employed herein is not only applicable to conjugation with another ethylenically unsaturated double bond but is applicable to other groups which can cause an electron shift away from the double bond. Such groups are known in the art and include the keto, carboxyl, —CH₂OH, nitrile, amido, halogen, —CH₂—O— and organic and inorganic ester groups. It is to be pointed out, however, that the presence of these groups per se does not destroy the ability of the compound to be epoxidized, and they are objectionable only if they are in such a relation to the ethylenically unsaturated group to be epoxidized as to cause electron shifting which is characteristic of conjugation. Such conjugation results when any of the aforesaid groups are attached directly to a carbon atom of the double bond. It is to be pointed out that the process of the present invention does not reside in the discovery of compounds capable of epoxidation since this is known to those skilled in the art but in the means by which the epoxidation is accomplished. However, in order to illustrate the versatility of the process of the present invention, the following description of epoxidizable compounds is given.

Compounds containing at least one epoxidizable double bond may be illustrated by the following formula

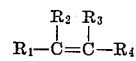

in which $R_1$ to $R_4$ are hydrogen or organic radicals bonded to the double bond by means of an aliphatic saturated carbon atom. The radicals may thus be saturated or unsaturated and the unsaturation may be of the epoxidizable type. The radicals may be hydrocarbon in nature or contain other elements. The radicals may be unsubstituted or substituted by hydrocarbyl radicals or by functional groups.

Specific illustrations of compounds that can be employed in the present invention are unsaturated glycidyl ethers and esters in which the unsaturation in the ether or acid radical is at least one carbon atom removed from the carbon attached to the ether oxygen or the carboxyl radical of the acid group. Unsaturated alcohols including esters thereof with organic or inorganic acids in which the unsaturation is again at least one carbon atom removed from the functional group, e.g.,

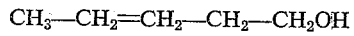

Unsaturated amides having the general formula

RCONH₂ where R is a mono- or polyunsaturated hydrocarbyl radical of at least five carbon atoms containing ethylenic unsaturation at least one carbon atom removed from the —CONH₂ group. Ketoamides having the general formula RCOR'CONH₂ where R is as indicated and R' is a divalent hydrocarbyl radical. Thioamides having the general formula RSNH₂ wherein R has the indicated meaning. Esterification products of epoxide resins and unsaturated fatty acids. Compounds having the general formula  where X is a phosphonium or halogen radical and X has the above indicated meaning.

The process of the present invention is of particular utility in the mono- or polyepoxidation of long chain unsaturated compounds such as fatty acids, their esters, nitriles and amides. These materials contain one or more ethylenic groups which are epoxidized in the final products.

Epoxidizable compounds particularly representative of those indicated herein are unsaturated glycerides, acids, and simple or complex esters derived from vegetable, animal, marine and petroleum sources. Some typical vegetable oils with non-conjugated unsaturation are tall oil, peanut, cottonseed, corn, soyabean, safflower, walnut, rapeseed, castor, linseed and perilla. Some typical animal fats are lard and various grades of tallow. Some typical marine oils are menhaden, sardine, cod, pilchard, shark, whale, and sperm oils. Oils and fats from these sources are essentially glycerides, excepting sperm and whale oils which are mixtures of glycerides and ester of mono-hydric long chain alcohols. Tall oil, as isolated, is in the acid form. These oils contain mixtures of esters of saturated and unsaturated fatty acids containing from six to twenty-six carbon atoms per straight chain. The unsaturated acids contain from one to four ethylenic groups. In addition, tall oil contains acids with a substituted and partially hydrogenated phenanthrene structure. In the mixture of fatty acids derived from these oils, or the esters themselves, there may be two alternatives: (1) The saturated and unsaturated components can be separated; or (2) the mixture can be used without further treatment. The latter is usually the preferred method.

Typical unsaturated, non-conjugated fatty acids, having one or more ethylenic groups, are lauroleic, $C_{12}H_{22}O_2$, myristoleic, $C_{14}H_{26}O_2$, palmitoleic, $C_{22}H_{44}O_2$, ricinoleic, $C_{18}H_{34}O_3$, linoleic, $C_{18}H_{32}O_2$, arachidonic, $C_{20}H_{32}O_2$. The vegetable, animal and marine oils are typical natural mixed glycerides containing these component acids which can be epoxidized individually or in mixed relationship and in substituted or unsubstituted condition, as desired.

Soybean oil is generically typical of a family of unsaturated non-conjugated compounds containing one or more ethylenic groups which can be epoxidized by the herein disclosed mixture of reactants. Soybean oil is representative of the following general types of epoxidizable glycerol esters: trilinoleate, trioleate, mono-oleate monolinoleate monolinolenate, mono-stearate dilinoleate, dilinoleate mono-oleate, dioleate monolinoleate, monooleate distearate, and dioleate monostearate.

The mixed fatty acids derived from the natural glycerides may be re-esterified with other polyhydric alcohols such as ethylene glycol, diethylene glycol, mono-, di-, and poly-pentaerythritol, sorbitol and the like. These epoxidized esters are less or more viscous than the corresponding glycerol esters. Viscosity is related to the functionality of the polyol as compared to glycerol. For some end uses viscosity of this origin is desirable.

As indicated, the natural oils or fatty acids may be converted to various types of esters as by alcoholysis or esterification with aliphatic and aromatic saturated and unsaturated, substituted and unsubstituted, mono- and poly-hydric alcohols. The alcohol radicals may also contain one or more epoxidizable ethylenic groups of the character defined hereinabove. However, it should be recognized that generally the process relates to epoxidizing unsaturated compounds having ethylenic groups, within the limits defined, irrespective of the substituent group or groups which may also contain an epoxidizable bond also within the limits defined.

The natural glycerides and the derived fatty acids serve as a base raw material for the preparation of mixtures of unsaturated fatty alcohols, ketones, amides, nitriles and esters. However, the alcohols are used in esters of both organic and inorganic acids.

The products from the natural glycerides are essentially straight chain compounds. Thus, the structure of the long chain radicals found in the unsaturated alcohols, amides, nitriles and esters are essentially identical with those of the starting materials. In the case of fat derived unsaturated ketones, the straight chain structure is doubled, minus a molecule of water and carbon dioxide.

Further valuable epoxidizable compounds containing unsaturation of the type hereinabove defined may result in other ways which involve the reaction of fat derived compound with themselves or products of other sources, e.g., petroleum. Thus, fatty acids, alcohols or esters may be dimerized or polymerized with themselves or copolymerized with other unsaturated reactive compounds. The latter include styrene, its homologs and derivatives, cyclopentadiene and its derivatives, mono- and poly-unsaturated straight and branched chain olefins, alpha-beta mono- and di-basic acids including esters, amides, and nitriles. These adducts may be representative of typical copolymer or Diels-Alder adduct compounds.

The products derived from petroleum sources are usually of a branched or cyclic structure. Typical unsaturated compounds useful for epoxidation by the process herein described, are obtained directly from petroleum, or formed during the cracking and reforming operations.

Many other compounds containing ethylenic groups are derived by chemical synthesis, fermentation, and the distillation of oleoresinous mixtures as gum turpentine.

The following is a partial non-limiting list of typical compounds containing ethylenic groups, as defined, which can be epoxidized by the process of the present invention:

UNSATURATED HYDROCARBONS

Pentenes
Hexenes
Heptenes
Octenes
Pentadienes
Hexadienes
Heptadienes
Octadienes
Tri-butylene
Turpentine
Di-, tri-, tetra-, penta-, and hexa-cyclopentadiene
Methyl cyclopentene
Methyl cyclohexene
Octadecene
Deca-, tetra-, hexa-, and octadecadiene (unconjugated)
Diisobutylene
Tri-iso-butylene
Tri-propylene
Pinene- and terpines
Cyclohexene
Cyclo-pentene

ALCOHOLS

Geraniol
Oleyl
Linoleyl
Linolenyl
Ricinoleyl
Erucyl

ACIDS

Oleic
Linoleic
Undecylenic
Erucic
Mixed soya bean
Mixed cotton seed
Tall oil

ETHERS

Dioleylether
Butyl crotyl ether
2-pentenyl butyl ether
4-pentenyl butyl ether
o-Allylphenyl ethyl ether
3-cyclohexenylmethyl alkyl ethers

KETONES

Butyl allyl ketone
Oleone

AMIDES

Mixed soya bean
Mixed cottonseed
Oleyl
Undecylene

NITRILES

Mixed soya bean
Mixed corn oil
Oleyl
3-pentene
Undecylene

NATURAL GLYCERIDES

Soyabean
Cottonseed
Linseed

Corn
Sunflower
Safflower
Palm
Walnut
Fish
Lard
Tallow

ESTERS

Vinyl oleate
Oleyl acetate
Linoleyl propionate
Dioleyl phthalate
Tetra oleyl pyromellitate
Dioleyl ethyl phosphate
Linoleyl oleate
Oleyl linoleate
Dilinoleyl adipate
Dioleyl maleate
3-cyclohexenyl methyl linoleate
Methyl acetoxy-12-ricinoleate
Acetoxy-12-ricinoleyl acetate
Mono-, di-, poly pentaerythritol esters of soya, tall, linseed, etc. derived acids

ADDITIONAL DERIVATIVES

Oleyl phosphate
Dioleyl phosphate
Oleyl chloride
Octadecadienyl chloride
Oleyl mercaptan The critical reagents employed to cause the epoxidation of the above-described unsaturated compounds are formic acid, a lower aliphatic acid which is preferably acetic acid, and hydrogen peroxide. Other suitable acids are propionic acid and glycollic acid.

Although not critical, concentrated hydrogen peroxide can be utilized in the process to accomplish improved yields of epoxidized products either in a normal or a shorter reaction time interval. For example, a 50% to 90% concentration of hydrogen peroxide in water can be utilized with the hydrogen peroxide present in an amount of about 0.3 to 5 moles per mole of unsaturation. The workable range of the mixed short chain organic acids is approximately 0.1 to 0.6 mole acetic acid and from approximately 0.10 up to about 0.5 mole formic acid per mole of unsaturation, as defined. In these acid mixtures the preferred range of formic acid is between about 0.1 to about 0.2 mole and the preferred acetic acid range is between about 0.1 to about 0.3 mole per mole of unsaturation.

As above indicated, the process of the present invention is preferably carried out in the presence of an acid catalyst, the best known of which is sulfuric acid. The above concentration range of the organic acid mixtures is preferably utilized with 0.25% to 1% concentrated sulfuric acid based on the total weight of the combined short chain acid and formic acid. The sulfuric acid may be replaced or used in conjunction with other catalysts. Under certain conditions the sulfuric acid may be as high as 5%. Mixtures of the catalyst can be utilized and the amounts used are dependent upon their separate methods of calculation.

A cationic exchange resin may be used in amounts varying up to 50% with the preferred amount being about 2% to 10% by weight based on the weight of the material treated. When utilized, the resins are preferably considered economically expendable and used in amounts of about 2% to about 4% of the material treated.

Other alkyl and aryl sulfonic acid catalysts such as ethane sulfonic, p-toluene sulfonic acid and their higher homologs may be utilized in lieu of sulfuric acid in this process. In addition, ion exchange resins can be mixed with any one of the above acid catalysts, in the process as herein described. The sulfuric acid is the preferred catalyst.

The process of epoxidation is preferably carried out in a glass or stainless steel reactor equipped with an agitator and heating and cooling coils. After the reaction, the separation of the oily and aqueous phases, is accomplished rapidly and preferably by centrifuging, although a gravity settling method can be used. The oily layer is pumped from the centrifuge to a stainless steel stripping vessel, and freed of volatile organic acids assisted by steam at reduced pressures and suitable temperatures. The reaction times and temperatures are related to the physical and chemical properties of the compounds to be epoxidized.

In some cases a non-polar solvent, at any suitable level, may be used to cut the viscosity and reduce the acidity in the oily layer. The solvent reduces the partition coefficient of the acid distribution between the oily layer and the aqueous layer while the organic compounds are undergoing epoxidation. In general compounds containing polar groups such as acid, nitrile, hydroxyl or amido groups are preferably epoxidized in the presence of a solvent.

Solvents used are non-reactive under the condition of epoxidation in this process. These include aromatic hydrocarbons, i.e., benzene and homologs and aliphatic homologous hydrocarbons starting with hexane. All solvents are readily recoverable.

The preferred procedure for epoxidation is to charge all unsaturated material to be epoxidized to the reactor, add 40% of the peroxide and about 70% of each of the organic acids. The remaining acids are mixed with the sulfuric acid and about 10% of this mixture is added initially to the above reactants with mixing and heating of the reaction mixture to within the temperature range of 120–140° F. causing initiation of the reaction. The exothermic nature of the reaction eliminates the need for further heating and may require cooling to maintain the temperature within the preferred range of 130 to 138° F. The remaining acids and catalysts are added proportionately as rapidly as cooling will permit while maintaining the temperature within the preferred range. Simultaneously the remaining peroxide is added over about a three-hour period whereas the remaining acids require about four to six hours for complete addition. The reaction is continued at that temperature until the desired oxirane and iodine values are obtained.

The final reaction mixture is pumped from the reactor to the centrifuges which separate it into aqueous and oily layers. The oily layer passes to a stripping vessel. Here it is freed of entrained volatile materials with washing or stripping with the aid of steam at reduced pressures and at temperatures as determined by volatility and stability of the compound. The oily product is cooled and filtered.

The overall rate of reaction is a function of the concentration of the reactants. Thus, a higher concentration of any one or more than one reactant will speed the reaction rate. A lower concentration can be utilized to effect partial epoxidation for residual unsaturation. However, the time is governed by the ability of the cooling equipment to dissipate the heat of reaction and maintain the temperature within the preferred range. a variation in reactant concentrations also governs side reactions which may or may not be desired. Thus, a reasonably wide variation in concentration of reactants can be used to either shorten or lengthen the reaction time to obtain lower residual unsaturation and higher oxirane.

In the following examples, illustrating the process of the present invention, the calculated amounts of reactants, for a complete or partial epoxidation, are based on the moles of unsaturation of the material to be epoxidized. In preferred practice, under optimum conditions, the addition is based on the following molar ratio: 1.1 moles hydrogen peroxide, 0.2 mole acetic acid and 0.2 mole formic acid per mole unsaturation and the catalyst is added on the basis of 1% by weight of the combined weight of acetic and formic acids. From the following illustrations it will be noted that the reaction time can be lessened. For example, by raising the reaction temperature, by increasing the peroxide concentration and by increasing the mixed acid and catalyst concentration within the limits defined. However, for the preferred procedure, the proportions as indicated are used.

*Example 1*

The following reagents were employed in the concentrations indicated.

| | Parts |
|---|---|
| Methyl oleate (Iodine Value 80.6; Acid Value 1.36) | 1450 |
| Hydrogen peroxide (50%) | 374 |
| Acetic acid | 55.2 |
| Formic acid (90%) | 47.1 |
| Sulfuric acid (conc.) | 1.02 |

The reaction was initiated by adding 80% of the peroxide and 70% of the acetic and formic acid in mixed form to the methyl oleate with stirring and heating to 134° F. The remaining 30% of acetic acid, formic acid and sulfuric acid were added portionwise, as cooling permitted, to the methyl oleate over a three-hour period with constant stirring. After the acids and catalyst addition was completed, the remaining 20% peroxide was added and the reaction continued for 12 hours at an average maintained temperature of 134° F. and with agitation. The agitator was stopped and reaction mixture was allowed to settle for 2½ hours, at normal temperature, and the separate oily layer was treated with a basic material to neutralize the acid catalyst. For example, the base material, a dilute solution of calcium hydroxide containing 1½ equivalents for each equivalent of residual sulfuric acid was added. The prepared epoxy-methyl oleate was then transferred to a stainless steel reaction vessel and steam distilled at reduced pressure up to 230° F., cooled to 150° F. and filtered. This clear brilliant product had the following analysis: Oxirane value was 4.08; Iodine Value 10.7; Acid Value 0.57. Color—2 to 3 Gardner. In mole ratios the proportions are 1.2 moles $H_2O_2$, 0.2 mole acetic acid and 0.2 mole formic acid per mole unsaturation.

*Example 2*

The following reagents are employed in the concentrations indicated:

| | Parts |
|---|---|
| Soybean oil (I.V. 128) | 1450 |
| Hydrogen peroxide (50%) | 596 |
| Acetic acid | 87.6 |
| Formic acid (90%) | 74.6 |
| Sulfuric acid (conc.) | 1.55 |

The soybean oil is epoxidized by adding 80% of the hydrogen peroxide thereto and 70% of the acetic acid. The mixture is heated to 134° F. and the remaining acetic acid is mixed with formic and sulfuric acid and progressively added over a three-hour period. After the acids and catalyst (sulfuric acid) are all added, the remaining hydrogen peroxide is introduced and the reaction continued at regulated average temperature of 134° F. and with constant agitation for about 14 hours. Thereafter the settling and separation of the epoxidized soybean oil is accomplished in the manner described in Example 1. The product has the following analysis: oxirane: 6.7%; hydroxyl value: 18.86%; I.V.=2; and ash 0.02%. The molar ratio of reactants was on the order of 1.2 moles $H_2O_2$, 0.2 mole acetic and 0.2 mole formic acids with 1% sulfuric based on weight of the acids.

*Example 3*

The following reagents were employed in the concentrations indicated:

| | Parts |
|---|---|
| Methyl oleate (I.V. 80.6) | 1450 |
| $H_2O_2$ (50%) | 374 |
| Acetic acid (glacial) | 55.2 |
| Formic acid (90%) | 47.1 |
| Sulfuric acid (conc.) | 1.02 |

The reaction was initiated by adding 80% of the peroxide and 50% of the acetic acid to the methyl oleate with stirring and agitation at 135° F. The remaining 50% of the acetic acid was mixed with the formic and sulfuric acids and added portionwise over a three-hour period. After the mixed acids addition was completed, the remaining 20% of the peroxide was added, and the reaction continued for an additional 9 hours at 135° F. to 136° F. under continuous agitation. Then the reaction was stopped and the mixture was allowed to settle. The oily layer was transferred into a vessel where it was treated with a basic material, i.e., a dilute solution of calcium hydroxide containing 1½ times the equivalent of residual sulfuric acid. The sulfuric acid-free oily product was steam distilled at reduced pressure up to 230° F. for ½ hour to remove residual acidity and water. It was then cooled to 150° F. and filtered. The clear product had the following analysis: Percent oxirane 4.24; I.V. 10.7; A.V. 0.57; color 2–3 Gardner.

*Example 4*

The following reagents were employed in the concentration indicated:

| | Parts |
|---|---|
| Linseed oil (I.V. 188.7) | 1450 |
| $H_2O_2$ (70%) | 630 |
| Acetic acid | 77.5 |
| Formic acid (90%) | 66.2 |
| Sulfuric acid (conc.) | 0.34 |
| Benzene (solvent) | 222.4 |

The reaction was initiated by adding 80% of the peroxide and 50% of the acetic acid to the linseed oil with stirring and agitation at 135° F. The remaining 50% of the acetic acid was mixed with the formic and sulfuric acids and added portionwise over a period of 3 hours. After the addition of the mixed acids was completed, the remaining 20% of the peroxide was added, and the reaction continued for an additional seven hours at 135° F. under continuous agitation. Then the reaction was stopped and the mixture was allowed to settle. The oily layer was transferred into a vessel where it was treated with a basic material, i.e., a dilute solution of calcium hydroxide containing 1½ times the equivalent of residual sulfuric acid. The sulfuric acid free oily product was steam distilled at reduced pressure up to 230° F. for ½ hour to remove residual acidity and water. It was then cooled to 150° F. and filtered. The clear product had the following analysis: Percent oxirane 8.4; I.V. 17.1; A.V. 0.3. With the 70% hydrogen peroxide the reaction time is reduced.

Another similar run for linseed oil, without solvent, and with the balance of the ingredients in the same proportion, produced an epoxidized product. The analysis shows percent oxirane 8.1; I.V. 22.7; A.V. 0.29; ash .02.

*Example 5*

The following reagents were employed in the concentrations indicated:

| | Parts |
|---|---|
| Oleyl acetate (I.V. 70.0) | 981 |
| Hydrogen peroxide (50%) | 221 |
| Acetic acid | 32.4 |
| Formic acid (90%) | 27.6 |
| Sulfuric acid (conc.) | 0.58 |

The reaction was initiated by adding 70% of the peroxide and 50% of acetic acid to the oleyl acetate with stirring and agitation to 135° F. The remaining 50% of the acetic acid was mixed with the formic and sulfuric acids and added portionwise over a period of 2½ hours. After the addition of the mixed acids was complete, the remaining 30% of the peroxide was added, and the reaction continued for an additional 11½ hours at 135° F. under continuous agitation. Then the reaction was stopped and the mixture was allowed to settle.

The oily layer was transferred into a vessel where it was treated with a basic material, i.e., a dilute solution of calcium hydroxide containing 1½ times the equivalent of residual sulfuric acid.

The sulfuric acid free oily product was steam-distilled at reduced pressure up to 230° F. for ½ hour to remove residual acidity and water. It was cooled to 150° F. and filtered. The clear product had the following analysis: Percent oxirane 3.21; I.V. 3.24; A.V. 0.37; Gardner color 2–3.

*Example 6*

The following reagents were employed in the concentrations indicated:

| | Parts |
|---|---|
| Soybean oil (I.V. 128.0) | 1450 |
| Hydrogen peroxide (70%) | 422.5 |
| Acetic acid | 87.6 |
| Formic acid (90%) | 74.6 |
| Sulfuric acid (conc.) | 1.55 |

The reaction was initiated by adding 70% of the peroxide and 91% of the acetic acid to the soybean oil with stirring and heating at 135° F. The remaining 9% of the acetic acid was mixed with the formic and sulfuric acids and added portionwise over a four hour period. After the addition of the mixed acids was completed, the remaining 30% of the peroxide was added, and the reaction continued for an additional four hours at 135° F. under continuous agitation. Then the reaction was stopped and the mixture was allowed to settle. The oily layer was transferred into a vessel where it was treated with a basic material, i.e., a dilute solution of calcium hydroxide containing 1½ times the equivalent of residual sulfuric acid.

The sulfuric acid free oily product was steam distilled at reduced pressure up to 230° F. for ½ hour to remove residual acidity and water. It was then cooled to 150° F. and filtered. The clear product had the following analysis: Percent oxirane 6.60; I.V. 2.2; A.V. 0.27; and Gardner color—1.

*Example 7*

The following reagents were employed in the concentrations indicated:

| | Parts |
|---|---|
| Soybean oil (I.V. 137.0) | 1450 |
| Hydrogen peroxide (50%) | 636 |
| Acetic acid (glacial) | 93.5 |
| Formic acid (90%) | 79.5 |
| Sulfuric acid (conc.) | 1.65 |

The reaction was initiated by adding 70% of the peroxide and 46% of acetic acid to the soybean oil with stirring and heating at 135° F. The remaining 54% of the acetic acid was mixed with the formic and sulfuric acids and added portionwise over a 2¾ hour period. After the addition of the mixed acids was completed, the remaining 30% of the peroxide was added and the reaction continued for an additional 11¼ hours at 135° F. under continuous agitation. Then the reaction was stopped and the reaction mixture was allowed to settle. The oily layer was transferred into a vessel where it was treated with a basic material, i.e., a dilute solution of calcium hydroxide containing 1½ times the equivalent of residual sulfuric acid.

The sulfuric acid free oily product was steam distilled at reduced pressure up to 230° F. for ½ hour to remove residual acidity and water. It was then colled to 150° F. and filtered. The clear product had the following analysis: Percent oxirane 6.93; I.V. 2.56; A.V. 0.41; and color—1 Gardner.

*Example 8*

The following reagents were employed in the concentrations indicated:

| | Parts |
|---|---|
| Safflower oil (I.V. 143.6) | 718 |
| Hydrogen peroxide (50%) | 327 |
| Acetic acid | 36.6 |
| Formic acid | 31.2 |
| Sulfuric acid (conc.) | 0.646 |

The reaction was initiated by adding 90% of the peroxide and 70% of the acetic acid to the safflower oil with agitation at 135° F. The remaining 30% of the acetic acid was mixed with the formic and sulfuric acids and added portionwise over a three-hour period. After the addition of the mixed acids was completed, the remaining 10% of the peroxide was added, and the reaction continued for an additional 11 hours at 135° F. under continuous agitation. Then the reaction was stopped and the mixture was allowed to settle.

The oily layer was transferred into a vessel where it was treated with a basic material, i.e., a dilute solution of calcium hydroxide containing 1½ times the equivalent of residual sulfuric acid.

The sulfuric acid free oily product was stripped with steam at reduced pressure up to 230° F. for ½ hour to remove residual volatile acidity and water. It was then cooled to 150° F. and filtered. The clear product had the following analysis: Percent oxirane 7.00; I.V. 10.9; Visc. 6 secs.; color 1.5 Gardner.

*Example 9*

The following reagents were employed in the concentrations indicated:

| | Parts |
|---|---|
| Oleyl oleate (I.V. 95.0) | 725 |
| Hydrogen peroxide (50%) | 221.5 |
| Acetic acid | 32.6 |
| Formic acid (90%) | 27.8 |
| Sulfuric acid (conc.) | 0.58 |

The reaction was initiated by adding 90% of the peroxide and 70% of the acetic acid to the oleyl oleate with agitation at 135° F. The remaining 30% of the acetic acid was mixed with the formic and sulfuric acids and added portionwise over a three-hour perior. After the addition of the mixed acids was completed, the remaining 10% of the peroxide was added, and the reaction continued for an additional 11 hours at 135° F. under continuous agitation. Then the reaction was stopped and the mixture was allowed to settle.

The oily layer was transferred into a vessel where it was treated with a basic material, i.e., a dilute solution of calcium hydroxide containing 1½ times the equivalent of residual sulfuric acid.

The sulfuric acid free oily product was stripped with steam to remove residual volatile acidity and water. It was then cooled to 150° F. and filtered. The clear product had the following analysis: Percent oxirane 5.17; I.V. 3.63; Visc. 1.2 secs.

*Example 10*

The following reagents were employed in the concentrations indicated:

| | Parts |
|---|---|
| Vinyl oleate (I.V. 80.0) | 725.0 |
| Hydrogen peroxide (50%) | 186.5 |
| Acetic acid | 27.4 |
| Formic acid (90%) | 23.4 |
| Sulfuric acid (conc.) | 0.49 |

The reaction was initiated by adding 90% of the peroxide and 70% of the acetic acid to the vinyl oleate with agitation and heating to 135° F. The remaining 30% of the acetic acid was mixed with the formic and sulfuric acids and added portionwise over a three-hour period. After the addition of the mixed acids was completed the remaining 10% of the peroxide was added, and the reaction continued for an additional 11 hours at 135° F. under continuous agitation. The reaction was stopped and the mixture was allowed to settle.

The oily layer was transferred into a vessel where it was treated with a basic material, i.e., a dilute solution of calcium hydroxide containing 1½ times the equivalent of residual sulfuric acid.

The sulfuric acid free oily product was stripped with steam at reduced pressure up to 230° F. for ½ hour to remove residual volatile acidity and water. It was then cooled to 150° F. and filtered.

The clear product had the following analysis: Percent oxirane 3.92; the I.V. due to vinyl unsaturation could not be accurately determined; Visc. 1.5 secs.; color 1.5 Gardner.

*Example 11*

The following reagents were employed in the concentrations indicated:

Soybean oil _____ 1450.00 parts (I.V. 128).
Hydrogen peroxide (50%) __ 590.00 parts.
Acetic acid (glacial) _____ 87.60 parts (0.2 mol./mol. of unsat.).
Formic acid (90%) _____ 74.60 parts (0.2 mol./mol. of unsat.).
Ion exchange resin (Dowex 50 WX 6) _____ 29.0 parts (2% based on the oil).

The reaction was initiated by adding 70% of the peroxide and 70% of the acetic acid to the soybean oil and resin mixture, with agitation at 135° F. The remaining 30% of the acetic acid was mixed with the formic acid and the mixed acids were added portionwise over a four-hour period. After the addition of the mixed acids was completed, the remaining 30% of the hydrogen peroxide was added and the reaction continued for an additional 10 hours at 135° F. under continuous agitation. Then the reaction was stopped and the mixture was allowed to settle.

The oily layer was transferred into a vessel where it was stripped with steam at reduced pressure up to 230° F. in order to remove residual volatile acidity and water. Then it was cooled to 150° F. and filtered.

The clear product had the following analysis: Percent oxirane 6.6, I.V. 8.6, hydroxyl value 12.3.

*Example 12*

The following reagents were employed in the concentrations indicated:

Soybean oil _____ 1450.00 parts (I.V. 128).
Hydrogen peroxide (70%) __ 455.00 parts.
Acetic acid (glacial) _____ 70.10 parts (0.15 mol./mol. of unsat.).
Formic acid (90%) _____ 57.50 parts (0.15 mol./mol. of unsat.).

The reaction was initiated by adding 75% of the peroxide and 70% of the acetic acid to the soybean oil with agitation at 135° F. The remaining 30% of the acetic acid was mixed with the formic and the mixture was added portionwise over a 2⅔ hour period. After the addition of the mixed acids was completed, the remaining 25% was added, and the reaction continued for an additional 9⅓ hours at 135° F. under continuous agitation. Then the reaction was stopped and the mixture was allowed to settle.

The oily layer was transferred into a vessel where it was stripped with steam under reduced pressure up to 230° F. in order to remove the residual volatile acidity and water. It was then cooled to 150° F. and filtered. The clear product had the following analysis: Percent oxirane 6.75; I.V. 5.7; hydroxyl value 14.

*Example 13*

The following reagents were employed in the concentrations indicated:

Soybean oil _____ 1450 parts (I.V. 128).
Hydrogen peroxide (70%) __ 455 parts.
Acetic acid _____ 70.1 parts (0.15 mole/mole of unsat.).
Formic acid (90%) _____ 57.5 parts (0.15 mole/mole of unsat.).
Sulfuric acid _____ 1.27 parts.

The reaction was initiated by adding 75% of the peroxide and 70% of the acetic acid to the soybean oil with agitation at 135° F. The remaining 30% of the acetic acid was mixed with the formic and sulfuric acids and added portionwise over a 2¼ hour period. After the addition of the mixed acids was completed, the remaining 25% of the peroxide was added, and the reaction continued for an additional 9¾ hours at 135° F. under continuous agitation. Then the reaction was stopped and the mixture was allowed to settle.

The oily layer was transferred into a vessel where it was treated with a basic material, i.e., a dilute solution of calcium hydroxide containing 1½ times the equivalent of residual sulfuric acid. The sulfuric acid free oily product was stripped with steam to remove residual volatile acidity and water. It was then cooled to 150° F. and filtered.

The clear product had the following analysis: Percent oxirane 6.83; I.V. 3.2; hydroxyl value 21.

*Example 14*

The following reagents were employed in the concentrations indicated:

Soybean oil _____ 1450.00 parts (I.V. 137).
Hydrogen peroxide (50%) __ 636.00 parts.
Acetic acid (glacial) _____ 141.00 parts (0.3 mole/mole of unsat.).
Formic acid (90%) _____ 79.50 parts (0.2 mole/mole of unsat.).
Alkane sulfonic acid _____ 2.13.

The reaction was initiated by adding 70% of $H_2O_2$ and 70% acetic acid to the soybean oil with agitation at 135° F. The remaining 30% of acetic acid was mixed with the formic acid and ethane sulfonic acid and the mixture was added portionwise over about a one-hour period. After the mixed acids addition was completed, the remaining 30% of the hydrogen peroxide was added, and the reaction continued for an additional 13 hours at 135° F. under continuous agitation. Then the reaction was stopped and the mixture was allowed to settle.

The oily layer was transferred into a vessel where it was treated with a basic material, i.e., a dilute solution of calcium hydroxide containing 1½ times the equivalent of residual alkane sulfonic acid.

The sulfonic acid free oily product was stripped with steam at reduced pressure up to 230° F. in order to remove the residual volatile acidity and water. It was then cooled to 150° F. and filtered. The clear product had the following analysis: Percent oxirane 6.97; I.V. 1.8 and hydroxyl value 19.

In some instances it may be desired to reduce the concentration of one or more of the reactants including the proportion of catalyst, if used, to effect only partial epoxidation for residual unsaturation. Otherwise, the reaction product may be analyzed to determine the extent of epoxidation desired.

Examples of compounds which are treated by the preferred process, in the presence of 50% solvent based on the total charge, to obtain partial epoxidation are the following:

| | Percent oxirane |
|---|---|
| Dicyclopentadiene | 0.50 |
| Tripropylene | 2.00 |
| Linseed oil-dicyclopentadiene copolymer | 5.80 |
| Oleyl alcohol | 3.65 |

The solvent utilized was benzene. However, other solvents, carbon tetrachloride, hexane, and homologs, can be used.

*Example 15*

A soybean oil in the proportion of 65.20 parts (I.V. 128) treated with an epoxidizing mixture of 0.20 mole per mole of unsaturation of propionic acid, 0.20 mole per mole of unsaturation of formic acid, 1.2 moles/mole of unsaturation of 50% hydrogen peroxide and 1% sulfuric acid by weight of the combined propionic and formic acids, produced a product yield having a 6.2% oxirane value, I.V. 2.9, hydroxyl value 21.0, and an acid value of 0.2. At the end of 12 hours the oxirane was determined at 5.95% and after about 14 hours the value was increased to 6.2% partial epoxidation.

*Example 16*

Another example of the same oil in the portion of 63.72 parts treated with an epoxidizing mixture of components, as described in Example 15, substituting glycollic acid for propionic acid, produced a yield product having an oxirane value 5.9%, I.V. 19.5, hydroxyl value 8.9 and an acid value 0.1. At the end of the 12 hour period the oxirane value was determined to be 5.83%.

To indicate an alternative process for epoxidizing suitable ethylenic linkages with a mixture of epoxidizing components, as described, there may be added to the unsaturated compound or component, first about 20% of the hydrogen peroxide initially with all the acids including the catalyst, and thence the remaining hydrogen peroxide portionwise over a period of time as rapidly as cooling permits. These additional and less preferred short chain acids may also be utilized in processes wherein suitable solvents, as indicated, are present in amounts which may vary from 10% to 100% by weight of the material undergoing epoxidation.

To illustrate the synergistic effect of the acids combination with and without a catalyst in further comparison with the effect of the acid components utilized alone with and without a catalyst, the following tabulation of runs and the results obtained by epoxidizing soybean oil is given:

The above runs 1 and 2 in comparison indicates the effect of sulfuric acid with respect to I.V. and oxirane values. The runs 3 and 4 shows the same effect.

Runs 3 and 5 indicates the synergistic effect of the increase in formic acid. Runs 1 and 6 shows the synergistic effect of the increase of acetic acid. Runs 5 and 7 indicates the effect of the presence of the catalyst. Runs 5, 7 and 8 also indicate the effect of the presence of the catalyst.

The runs 10–14 indicate the effect of an increase in concentration of the hydrogen peroxide, with and without a catalyst and also shows the beneficial factor in cutting down the reaction time from 14 hours to 7½ hours. Comparison of runs 1, 10 and 14 indicate the effects of the catalyst in relationship to concentration of hydrogen peroxide. In runs 11 and 12, is indicated the effect of the presence of catalyst and concentration of hydrogen peroxide in relationship to concentrations of the mixed acid at levels where each acid alone would not provide satisfactory or comparable results. In general the runs indicate that the process herein disclosed provides an alternative method of epoxidation, wherein the molar ratios of the mixed acids, with and without catalyst, are used at preferred levels at which the acids, if utilized alone, do not operate satisfactorily.

The foregoing examples have illustrated the use of the synergistic combination of formic and short chain carboxylic acids under a variety of conditions with a variety of epoxidizable compositions. The same procedures are also applicable to other epoxidizable compounds hereinabove defined.

To more clearly illustrate the differences and improvement provided by the hereindescribed preferred process of epoxidation of soybean oil with mixed acetic acid and formic acid catalyzed by sulfuric acid, the following comparative runs were made to determine a comparative evaluation with other known processes. Such processes being exemplified by the in situ acetic acid process for the production of epoxy products as first discovered and described in the copending application by Hansen et al., Ser. No. 333,372, filed Dec. 26, 1963, and now abandoned, and the formic acid process, heretofore indicated as known in the art.

Also, the products distinguish over the recognized and expected formation of hydroxylated compounds obtained by reacting unsaturated compounds with acetic acid or formic acid in the presence of hydrogen peroxide and a catalyst as disclosed by Swern in U.S. Patent 2,443,280, Bergsteinsson et al., in U.S. Patent 2,500,599, and noted in the publication J. Am. Chem. Soc., 67, 1786–1788 (1954).

| Run No. | SIB I.V. | Mole of acids per moles of Unsaturation | | Percent $H_2SO_4$ or Other | Rx. Time, Hrs. | Conc. of $H_2O_2$ Used,[1] Percent | Analytical data on stripped product | |
|---|---|---|---|---|---|---|---|---|
| | | HAC | HCOOH | | | | Percent Oxir. | I.V. |
| (1) | 133.6 | 0.20 | 0.20 | | 14 | 50 | 6.21 | 9.5 |
| (2) | 137 | 0.20 | 0.20 | 1 | 14 | 50 | 6.93 | 2.56 |
| (3) | 133.6 | 0.30 | 0.10 | | 14 | 50 | 5.60 | 27.7 |
| (4) | 137 | 0.30 | 0.10 | 1 | 14 | 50 | 6.7 | 8.64 |
| (5) | 137 | 0.30 | 0.20 | | 14 | 50 | 6.5 | 8.8 |
| (6) | 137 | 0.40 | 0.20 | | 14 | 50 | 6.45 | 6.60 |
| (7) | 137 | 0.30 | 0.20 | 1 | 14 | 50 | 6.75 | 1.06 |
| (8) | 137 | 0.30 | 0.20 | 0.5 | 14 | 50 | 6.58 | 3.58 |
| | | | | Alkyl-Sulfonic Acid | | | | |
| (9) | 137 | 0.30 | 0.20 | 1 | 14 | 50 | 6.77 | 1.80 |
| (10) | 137 | 0.20 | 0.20 | | 12 | 70.0 | 6.46 | 2.97 |
| (11) | 137 | 0.15 | 0.15 | | 12 | 70.0 | 6.70 | 5.72 |
| (12) | 137 | 0.15 | 0.15 | 1 | 12 | 70.0 | 6.78 | 3.2 |
| (13) | 137 | 0.30 | 0.20 | | 10 | 70.0 | 6.46 | 3.53 |
| (14) | 137 | 0.20 | 0.20 | 1 | 7½ | 70.0 | 6.70 | 2.34 |

[1] All $H_2O_2$ was employed in a mole ratio of 1.2 per mole of unsaturation.

|                    | Acetic Acid | Mixed Acids | Formic Acid |
|--------------------|-------------|-------------|-------------|
| Percent oxirane    | 6.2–6.4     | 6.4–6.6     | 6.2–6.4.    |
| OH value           | 20–28       | 16–22       | 22–36.      |
| Elec. resistivity  | 2–3         | 1–2         | 1.5–3.      |
| Visc. stokes       | 5.5–6.5     | 4.5–5.5     | 5.5–7 stokes. |
| SO₄ p.p.m.         | 700–900     | 50–100      |             |
| Ash                | 0.07–.140   | 0.002–0.02  | 0.002–0.02. |
| I.V.               | Min. 2.5    | Min. 1.     | Min. 2.5.   |

It will be recognized from the above, that improvements were obtained in higher mean oxirane values, the lower mean hydroxyl value, the lesser sulfation, and the average mean improvement in electrical resistivity, aside from providing the art with a new and improved process for producing epoxidation. The minimum I.V. for mixed acids can be reduced further, without splitting, by additional in situ treatment whereas the other and different processes will not permit this. Particularly epoxidation of substituted and unsubstituted, unsaturated non-conjugated fatty chains is obtained. In general the comparative examples illustrate that the herein disclosed combination of reactants provide an improved method of obtaining high oxirane low ash, low iodine values, less sulfation when a sulfur type catalyst is used, a lower mean hydroxylation value and better electrical resistivity when a catalyst is used, a lower mean hydroxylation value and improved viscosity control.

The epoxides produced by the process of the present invention are useful as chemical intermediates, in the textile industry, the formation of plastics, plastisols, as plasticizers for vinyl resins and nitrocellulose, in printing inks, in alkyd resins, as antioxidants, in cosmetics, insecticides, halogen acceptors, color stabilizers, and for and in many other useful applications known to the art. Certain of the epoxy compounds are useful plasticizers in cellulosic compositions; they may also be used as solvents and in the formation of bodied polymers and copolymerized resinous materials. In addition, the ester products may be converted to epoxidized metal salts including the metals, for example, copper, mercury, lead, chromium, iron, cadmium, strontium, and metals in Groups I and II of the Periodic Table.

What is claimed is:

1. In the process of producing a compound containing an oxirane linkage by epoxidizing an unsaturated fatty acid compound of at least 5 carbon atoms and containing at least one epoxidizable unconjugated ethylenically unsaturated group, the steps which comprise mixing the unsaturated fatty acid compound with an epoxidizing composition of reactants consisting essentially of a combination of (a) from 0.1 to 0.5 mole per mole of epoxidizable ethylenic unsaturation of formic acid, (b) from 0.1 to 0.6 mole per mole of epoxidizable ethylenic unsaturation of a short chain carboxylic acid selected from the class consisting of acetic acid, propionic acid and glycolic acid, (c) from 0 to 1.0% by weight of said formic acid and said short chain carboxylic acid of an acid catalyst selected from the class consisting of sulfuric acid, alkylsulfonic acid, and arylsulfonic acid, and (d) from 0.3 to 5.0 moles of hydrogen peroxide per mole of epoxidizable ethylenic unsaturation; effecting an epoxidation of said ethylenic group by said epoxidizing composition; and separating from the mixture an oxirane linkage-containing product.

2. The process of claim 1 wherein the short chain carboxylic acid is acetic acid.

3. The process of claim 2 wherein the epoxidizable fatty acid compound is an unsaturated fatty acid ester.

4. The process of claim 2 wherein the epoxidizable compound is an unsaturated fatty acid.

5. The process of claim 2 wherein the acid catalyst is sulfuric acid.

6. The process of claim 2 wherein the epoxidation is carried out in the presence of an inert hydrocarbon solvent.

7. The process of claim 5 wherein the concentration of acetic acid is from 0.1 to 0.3 mole, and the formic acid is from 0.1 to 0.2 mole per mole of epoxidizable ethylenic unsaturation.

8. In the process of epoxidizing a fatty acid glyceride containing at least 5 carbon atoms in the fatty acid radical and containing at least one epoxidizable unconjugated ethylenically unsaturated group, the steps which comprise mixing said fatty acid glyceride with (a) 0.3 to 5.0 moles of hydrogen peroxide per mole of unsaturation, (b) 0.1 to 0.6 mole of acetic acid per mole of unsaturation, (c) 0.1 to 0.5 mole of formic acid per mole of unsaturation, and (d) 0.25 to 1.0% by weight of the formic acid and acetic acid of sulfuric acid; agitating and maintaining said mixture at a temperature between 100° and 150° F. and effecting the production of an oxirane linkage-containing compound.

9. The process of claim 8 wherein the fatty acid glyceride is a vegetable oil.

10. The process of claim 8 wherein the fatty acid glyceride is a soybean oil.

References Cited

UNITED STATES PATENTS

| 2,745,848 | 5/1956  | Greenspan et al. | 260—348.5   |
| 2,801,253 | 7/1957  | Greenspan et al. | 260—348.5   |
| 2,810,733 | 10/1957 | Greenspan et al. | 260—348.5   |
| 2,813,878 | 11/1957 | Wahlroos         | 260—348.5   |
| 3,010,976 | 11/1961 | Greenspan et al. | 260—348.5 X |
| 3,020,292 | 2/1962  | Swern            | 260—348.5 X |
| 3,210,328 | 10/1965 | Kiefer           | 260—348.5   |

OTHER REFERENCES

Swern, Chemical Reviews, Vol. 45 (1949), pp. 1–9.

WALTER A. MODANCE, *Primary Examiner.*

NORMA S. MILESTONE, *Assistant Examiner.*